United States Patent
Keohane et al.

(10) Patent No.: US 8,379,822 B2
(45) Date of Patent: *Feb. 19, 2013

(54) CONFERENCE CALL INITIALIZATION

(75) Inventors: Susann Marie Keohane, Austin, TX (US); Gerald Francis McBrearty, Austin, TX (US); Shawn Patrick Mullen, Buda, TX (US); Jessica Kelley Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 942 days.

This patent is subject to a terminal disclaimer.

(21) Appl. No.: 12/049,300

(22) Filed: Mar. 15, 2008

(65) Prior Publication Data

US 2008/0159511 A1 Jul. 3, 2008

Related U.S. Application Data

(63) Continuation of application No. 10/865,703, filed on Jun. 10, 2004, now Pat. No. 7,483,526.

(51) Int. Cl.
*H04M 3/42* (2006.01)

(52) U.S. Cl. .......... 379/202.01; 379/93.21; 379/158; 379/201.01; 370/261; 455/416

(58) Field of Classification Search .......... 379/202.01, 379/93.21, 157, 158, 201.01, 207.01; 370/259, 370/260, 261; 455/414.1, 416

See application file for complete search history.

(56) References Cited

U.S. PATENT DOCUMENTS

| | | | |
|---|---|---|---|
| 5,483,588 A | 1/1996 | Eaton et al. | 379/202.01 |
| 6,192,119 B1 | 2/2001 | Wilson | 379/202 |
| 7,180,997 B2 * | 2/2007 | Knappe | 379/387.01 |
| 2002/0131565 A1 * | 9/2002 | Scheuring et al. | 379/88.19 |
| 2003/0035381 A1 * | 2/2003 | Chen et al. | 370/261 |
| 2003/0046344 A1 | 3/2003 | Kumhyr et al. | 709/205 |
| 2004/0141605 A1 | 7/2004 | Chen et al. | 379/202.01 |
| 2005/0018826 A1 * | 1/2005 | Benco et al. | 379/202.01 |
| 2005/0032538 A1 * | 2/2005 | Noel et al. | 455/518 |
| 2005/0152523 A1 | 7/2005 | Fellenstein et al. | 379/202.01 |
| 2006/0177034 A1 * | 8/2006 | Reding et al. | 379/211.02 |

* cited by examiner

*Primary Examiner* — Ahmad Matar
*Assistant Examiner* — Khai N Nguyen
(74) *Attorney, Agent, or Firm* — VanLeeuwen & VanLeeuwen; Diana R. Gerhardt (57) ABSTRACT

An approach for using a centralized conference call manager is provided for initiating conference calls. Users register with the centralized conference call manager to set up a conference call at a future date and time. When the designated time/date arrive, the centralized conference call manager contacts the various intended attendees using a variety of contact locations (e.g., office telephone, mobile telephone, home telephone, etc.). The system further allows an intended attendee to, when contacted by the centralized conference call manager, provide a different contact number that the conference call manager will use instead. An anticipated attendee can decline the call and provide a verbal reason for not being able to attend. The centralized conference call manager records the reason and, when requested, plays the reason back to the other attendees.

20 Claims, 7 Drawing Sheets

CONFERENCE CALL INITIALIZATION

RELATED APPLICATIONS

This application is a continuation application of U.S. Non-Provisional patent application Ser. No. 10/865,703, entitled "System and Method for Conference Call Initialization," filed on Jun. 10, 2004 now U.S. Pat. No. 7,483,526.

BACKGROUND OF THE INVENTION

1. Technical Field

The present invention relates in general to a system and method for initiating telephone calls. More particularly, the present invention provides a system method for a centralized conference call manager to initiating the conference call by calling parties at the designated time.

2. Description of the Related Art

Voice communication is the most common and one of the oldest forms of real-time remote communications. Real-time remote forms of communications are very good alternatives to face-to-face meetings, in which real-time communication is an important aspect. Voice communications are used for casual conversations, to conduct business, to summon for help in an emergency, to access special services (such as banking, retrieving messages), etc.

There are numerous types of devices operating over numerous types of networks to facilitate voice communications. Most of the voice-capable networks are also capable of transmitting data. The most common voice communication device is the traditional telephone operating over the Public Switched Telephone System (PSTN), also known as the Plain Old Telephone System (POTS). Through the PSTN, telephones are linked using complex switching systems at central offices or exchanges that establish a pathway for voice to be transmitted and received between one or more of the telephones. With appropriate devices, such as modems, for examples, the PSTN can be used for the transmission of data. The PSTN is still one of the most reliable networks for voice communication.

Voice communication can also be facilitated over the Internet or other such networks. Computers connected to the Internet first convert the voice into digital information and then convert the information into data packets. The packets are created according to the Transmission Control Protocol (TCP), a set of rules used with the Internet Protocol (IP) to send data in the form of packets between computers over the Internet. IP handles the actual delivery of the data while TCP keeps track of the individual data packets, into which the voice or other data is divided, for efficient routing through the Internet. The process of transmitting voice over the Internet or other such networks is called voice-over-IP. Voice communication through the Internet is not as reliable as it is through the PSTN. Internet-type networks were designed for data transmission where "real-time" transmissions are not necessary. The speed with which the packets move from one user to the other is very dependent on the type of connection each user establishes to the Internet, the type of computers/communication lines that exist between the two users, the amount of traffic through the internet, etc.

Mobile phones and the wireless mobile network provide yet another method for voice communication. Through shortwave analog or digital transmissions, a user establishes a wireless connection from a mobile telephone to a nearby transmitter. Generally, mobile telephone service is available in urban areas and along major highways. As the mobile telephone user moves from one cell or area of coverage to another, the mobile telephone is transferred from one transmitter to the next. Today, the mobile network may be accessed not only by traditional personal mobile phones but also by Personal Data Assistants (PDAs), notebook computers with special communications cards, combination devices, etc. Many of these networks are capable of also transmitting through a number of existing protocols. Voice communication through the mobile network is also not as reliable as voice communication through the PSTN. Depending on the geography, certain areas may have better receptions than others. In large cities, for example, reception may be affected, for example, by big buildings, etc. A user who moves into a no-reception "pocket" can be "dropped" from the call. A user may also be dropped while being transferred from one transmitter to the next. For example, a transmitter may be at full capacity and thus not be able to handle additional users.

Satellites provide another medium through which voice can be transmitted. A satellite is a specialized wireless receiver/transmitter launched by a rocket and placed in orbit around the earth. There are hundreds of satellites currently in operation. Geostationary satellites, the most common type of satellite, orbit the earth directly over the equator remaining over the same spot at all times. A geostationary satellite can be accessed using an antenna aimed at the spot in the sky where the satellite hovers. A low-earth-orbit (LEO) system employs a large fleet of satellites in a circular orbit at a constant altitude of a few hundred miles over the geographic poles. An LEO satellite system operates similarly to a mobile phone network where users are transferred from satellite to satellite. As with any other wireless system of communication, reliability is a concern. The connection to the satellite may be affected by such things as weather, obstacles between the user and the satellite (such as being inside a building).

These and other types of networks through which voice may be transmitted are linked with one another to facilitate voice communication across all of the networks. For example, a mobile phone user may establish a telephone call with a user connected through the PSTN, a user having a satellite phone, a user connected through the Internet, etc. In addition, communication may be established between more than two users. Some telephone devices and services are "three-way" capable and establish communication between three users. Certain devices and services have the capability to conference three or more users. A telephone conference allows multiple parties to talk to each other in real time.

Typically, a conference leader contacts a telecommunications service provider and reserves a conference bridge, a computer-controlled device for interconnecting callers. The user reserves a certain number of telephone lines at a specific date and time. The conference leader may provide each user with an access number and/or password/access code. The users dial in from any type of voice-capable communications device that can access the bridge.

As the number of users increases, it becomes increasingly difficult to carry out the conference efficiently. At times, certain users may not be able to initially join the conference or a user may be dropped from a conference. The user, for example, may not be able to connect to (or may lose connection to) the conference due to problems with the user's handset or device, due to problems with one or more of the networks or due to too high network traffic, etc. In addition, the user may not be able to connect because of unexpected circumstances or because the user's handset is not functioning. Furthermore, having users call into a conference call necessitates that each of the users remember to dial into the conference on a particular date and time. When a user fails to dial into the conference, the other participants to the conference call often wind up waiting for the person to join the call or use other telephones in order to attempt to locate and remind the absent user of the scheduled conference call.

What is desired, therefore, is a method and system that provides a centralized call manager that calls a group of conference call attendees and initiates the conference call. What is further needed is a system and method that can "find" an intended attendee using a number of different contact numbers. What is also needed is a system and method that keeps track of conference call data as well as messages for intended attendees that are unable to join the conference call and relay such information to the other attendees.

SUMMARY

It has been discovered that a system and method can be provided to address the aforementioned challenges. In particular, the system and method includes a centralized conference call manager that can be accessed through a variety of networks (e.g., PSTN, the Internet, etc.) to set up a conference call at a future time and date.

When the designated time/date arrive, the centralized conference call manager contacts the various intended attendees using a variety of contact locations (e.g., office telephone, mobile telephone, home telephone, etc.). The system further allows an intended attendee to, when contacted by the centralized conference call manager, provide a different contact number that the conference call manager will use instead. For example, suppose the conference call manager contacted an attendee using the attendee's mobile telephone but the attendee noticed that his cell phone battery was running low, the attendee could provide a call back number that the conference call manager would use to contact the attendee and join the attendee to the conference call.

The centralized conference call manager also keeps track of data pertaining to the conference call. For example, is an intended attendee is unable to attend (e.g., a more important meeting has been scheduled, the attendee needs to handle an emergency or crisis, etc.), the intended attendee, when called by the centralized conference call manager, can decline the call and provide a verbal reason for not being able to attend. The centralized conference call manager records the reason and, when requested, plays the reason back to the other attendees. The centralized conference call manager also keeps track of when attendees join the conference call and when they hang up or are dropped from the conference call.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description. As used herein, the terms "user," "party," "client," "attendee," "anticipated attendee," and "contact" are used interchangeably to refer to a person or device that is joined to a conference call or otherwise interacts with the centralized conference call manager to perform conference call activities, as the context and other indicia (such as the figures) so indicate.

Figure 1:
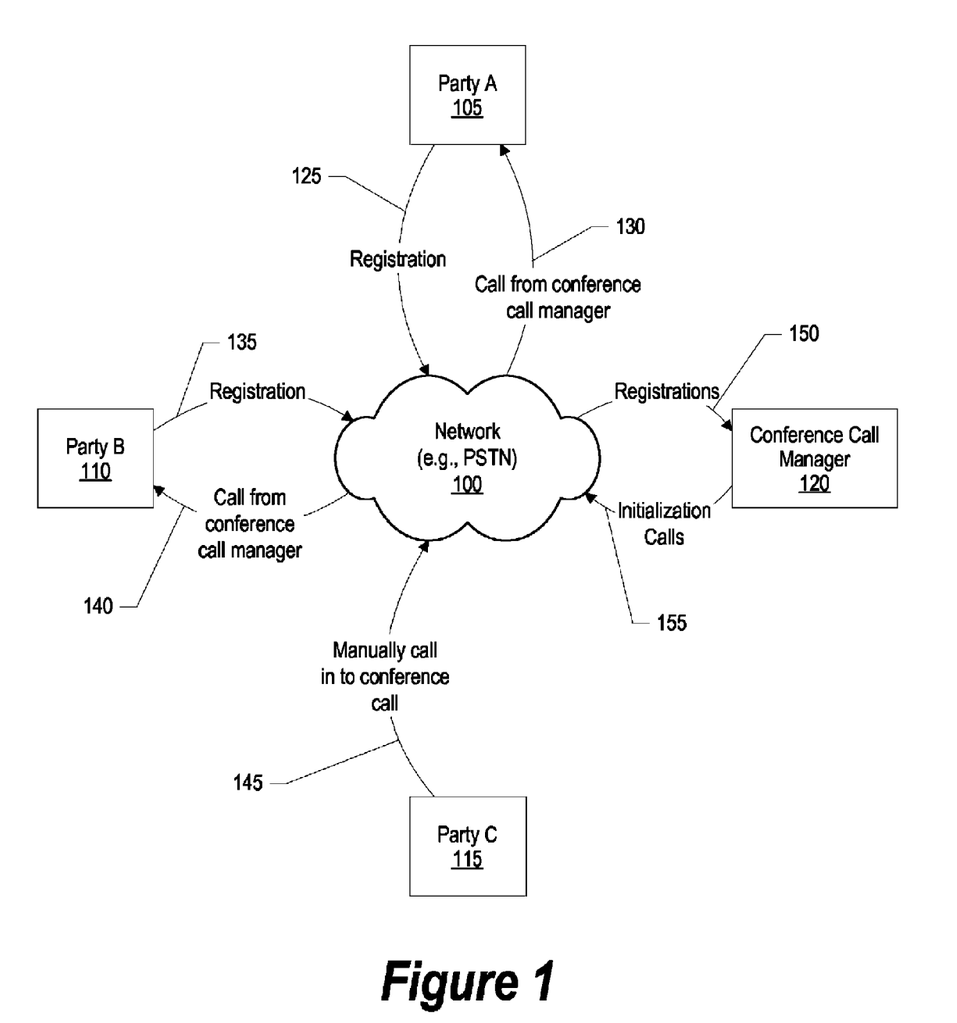
FIG. 1 is a network diagram showing the centralized conference call manager connected to various parties using a network.

FIG. 1 is a network diagram showing the centralized conference call manager connected to various parties using a network. Network 100 interconnects centralized conference call manager 120 with the various parties, such as Party A (105), Party B (110), and Party C (115). In one embodiment, network 100 is a Public Switched Telephone Network (PSTN). In another embodiment, network 100 is a computer network, such as the Internet, that is capable of transmitting voice data (e.g., voice over IP).

In the example shown in FIG. 1, Party A (105) and Party B (110) are both shown registering with centralized conference call manager 120 (registration data flows 125 and 130, respectively). The registrations inform the centralized conference call manager that a conference call is being scheduled as well as provides the centralized conference call manager with one or more telephone numbers to use when calling the parties for the conference call. Party C (115) is shown not registering with centralized conference call manager, but instead manually calls into the conference call using telephone call 145 placed to the centralized conference call manager. Registrations 150 are received by centralized conference call manager 120 and stored in a nonvolatile data store for subsequent retrieval.

When the date and time for the conference call arrive, centralized conference call manager 120 initiates the conference call by placing initialization calls 155 through network 100 to the various parties that have registered for the conference call—in this case Parties A and B (105 and 110). The centralized conference call manager may attempt several calls to each of the registered parties based upon the information provided by the parties during registration.

For example, Party A (105) may have indicated a preference for receiving a call on his office telephone by leaving his office telephone number with the centralized conference call manager as the primary contact number. In addition, Party A may have provided alternative telephone numbers, such as a mobile telephone number and a home telephone number, for the centralized conference call manager to use if Party A does not answer when called at the preferred (office) telephone number. In this manner, the centralized conference call manager "tracks down" the parties using preference information provided by the party.

Parties that registered for the conference call do not have to be as concerned or take the same precautions (i.e., set alarms, etc.) so that they do not miss the conference call. This is because the centralized conference call manager initiates the conference call alleviating the party from the need to remember the exact date and time of the call or remembering a telephone number needed to call into the conference call. When a party is successfully tracked down, the party "joins" the conference call through calls that were placed by the centralized conference call manager. In FIG. 1, Party A (105) joins by answering call 130 and Party B (110) joins by answering call 135, where both calls 130 and 135 were placed by centralized conference call manager 120.

Figure 2:
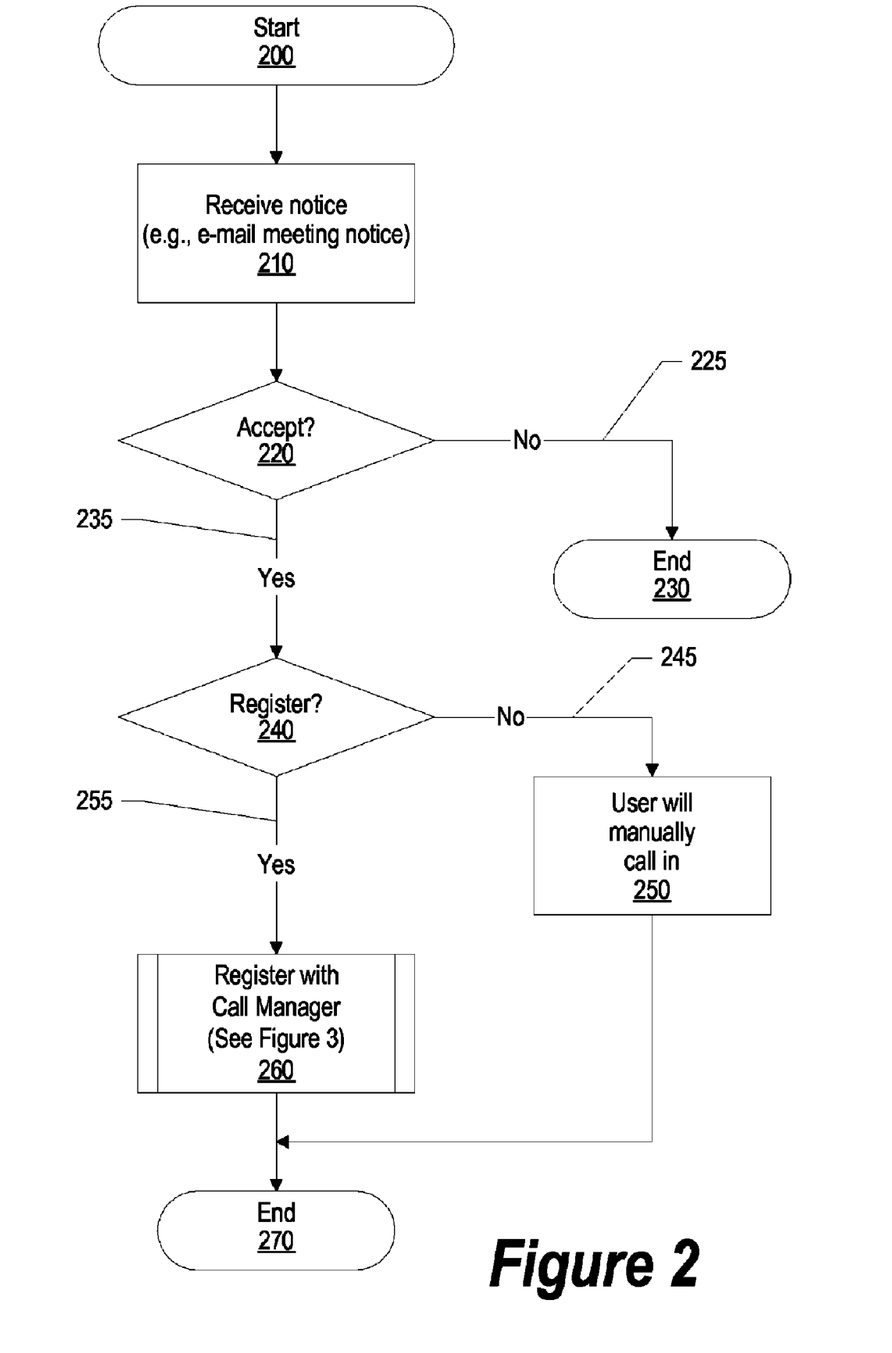
FIG. 2 is a high level flowchart showing steps taken by a client to register with the centralized conference call manager.

FIG. 2 is a high level flowchart showing steps taken by a client to register with the centralized conference call manager. Processing commences at 200 whereupon, at step 210, a party receives a notice regarding an upcoming conference call. The notice can be received in an email message, a telephone call, verbally during a discussion or in-person meeting, or any number of ways.

The party makes a determination as to whether to accept the notice and attend the upcoming conference call (decision 220). If the party decides not to attend the upcoming conference call, decision 220 branches to "no" branch 225 whereupon processing ends at 230.

On the other hand, if the party accepts the notice and decides to attend the upcoming conference call, decision 220 branches to "yes" branch 235 whereupon another determination is made. This time, the party decides whether register with the centralized conference call manager or call in manually (decision 240). If the party decides not to register with the centralized conference call manager, decision 240 branches to "no" branch 245 whereupon the user will manually call into the conference call (step 250).

Figure 3:
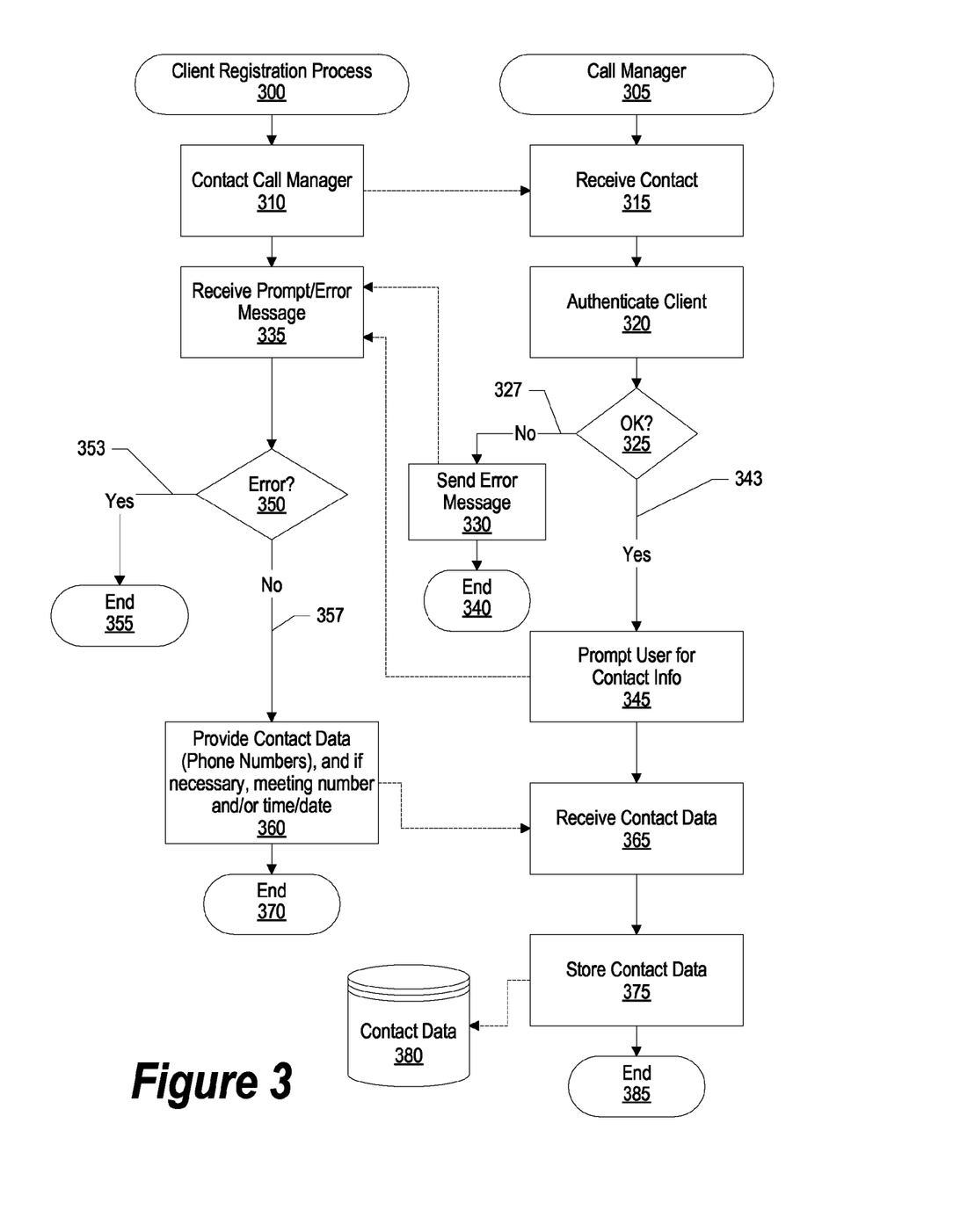
FIG. 3 is a flowchart showing the centralized conference call manager registration steps.

On the other hand, if the user decides to register with the centralized conference call manager, decision 240 branches to "yes" branch 255 whereupon the party registers the upcoming conference call with the centralized conference call manager (predefined process 260, see FIG. 3 and corresponding text for processing details). Processing thereafter ends at 270.

FIG. 3 is a flowchart showing the centralized conference call manager registration steps. Client (i.e., "Party," or "Conference Call Party," etc.) registration process commences at 300 whereupon, at step 310, the client contacts the centralized conference call manager using the network (e.g., PSTN, the Internet, etc.).

Centralized conference call manager processing commences at 310 whereupon, at step 315, the centralized conference call manager receives the registration materials from the client, such as an identifier (e.g., a client code, one of the client's telephone numbers, etc.), a password, and other information regarding the client. At step 320, the centralized conference call manager authenticates the client using the provided information.

A determination is made as to whether the client was successfully authenticated (decision 325). If the client was not successfully authenticated, decision 325 branches to "no" branch 327 whereupon, at step 330, an error message is returned to the client over the network, and centralized conference call manager processing ends at 340.

On the other hand, if the client was successfully authenticated using the provided information, decision 325 branches to "yes" branch 343 whereupon, at step 345, the centralized conference call manager prompts the authenticated user for contact information, such as the time and date of the conference call (or a conference call identifier if the conference call was already set up by someone else), and one or more phone numbers that the user desires that the centralized conference call manager use when calling the user to initiate the conference call.

The client receives either an error message (if the client was not authenticated) or a prompt for conference call contact information at step 335. A determination is made as to whether the client received an error (decision 350). If the client received an error (i.e., the client was not authenticated), then decision 350 branches to "yes" branch 353 and client processing ends at 355. On the other hand, if the client did not receive an error, decision 350 branches to "no" branch 357 whereupon, at step 360, the client provides the conference call data to the centralized conference call manager. The information can include one or more phone numbers that the centralized conference call manager will use to call the client and, if necessary, a conference, or meeting, identifier, or the date and time of the conference call. Client registration processing thereafter ends at 370.

Returning to centralized conference call manager processing, the centralized conference call manager receives the client's contact data at step 365. At step 375, the centralized conference call manager stores the received contact data in data store 380 for subsequent retrieval and usage. Centralized conference call manager processing thereafter ends at 385.

Figure 4:
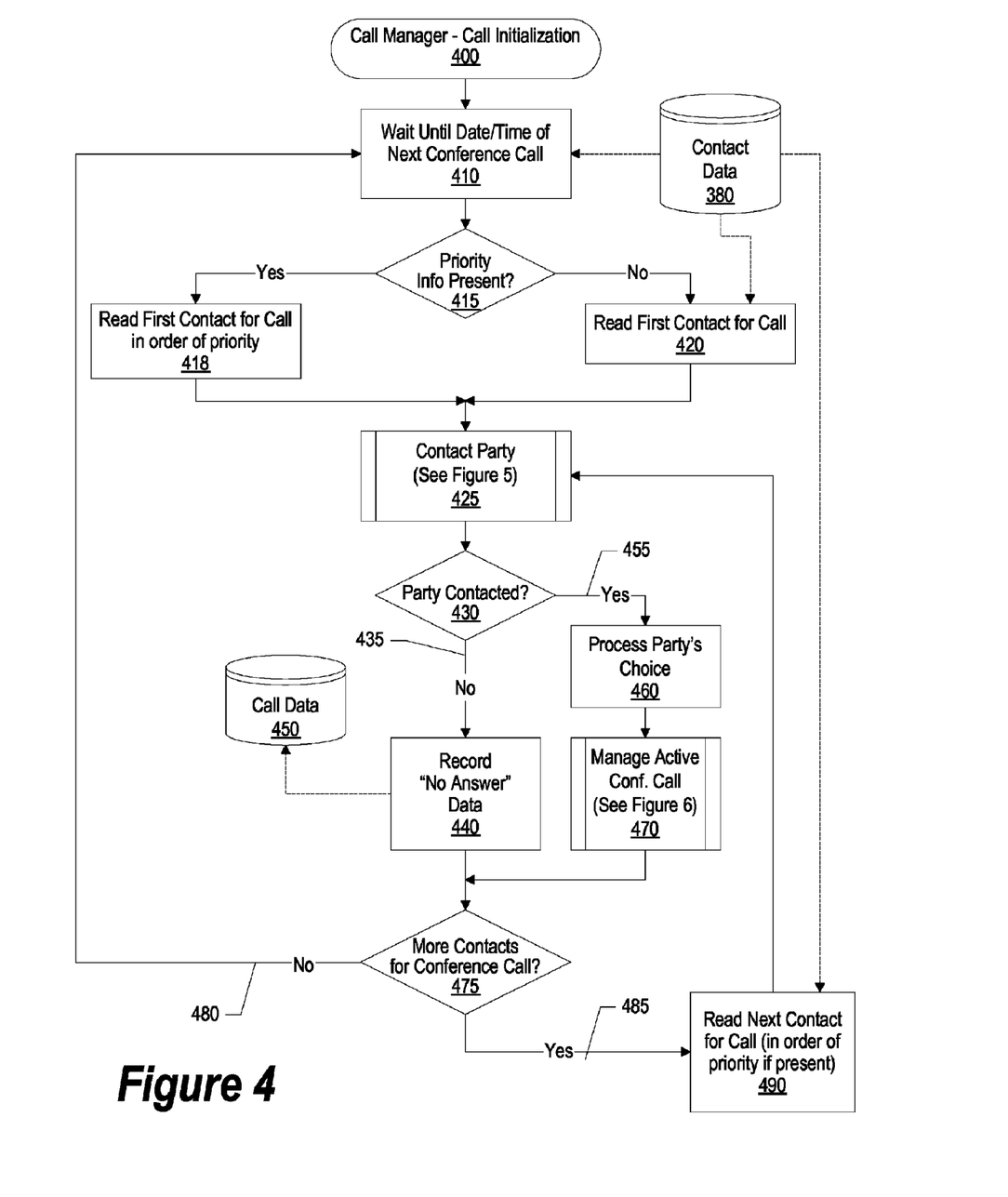
FIG. 4 is a high level flowchart showing steps taken by the centralized conference call manager to initiate a conference call.

FIG. 4 is a high level flowchart showing steps taken by the centralized conference call manager to initiate a conference call. In one embodiment, two or more of the anticipated attendees are called by the centralized conference call manager in parallel in order to avoid delays in joining the attendees to the conference call. In another embodiment, the contact data includes priority information that, if present, indicates an order that conference call attendees should be added to the conference call. For example, an initiator of the conference call may wish to be the first party joined to the conference call in order to make introductions or otherwise greet attendees that subsequently join the conference call. Centralized conference call manager call initialization processing commences at 400 whereupon, at step 410, the centralized conference call manager reads contact data store 380 that includes the dates and times for all conference calls being managed by the centralized conference call manager. When the date/time of the next conference call arrives, processing determines if priority information is present at step 415. If priority information is present, processing branches to step 418 whereupon data corresponding to the first contact, in order of priority, is read from data store 380. If priority information is not present, processing branches to step 420 whereupon data corresponding to the first party that registered for the conference call is read from data store 380. The data, which may include several contact numbers, is used to contact the selected party (predefined process 425, see FIG. 5 and corresponding text for processing details).

A determination is made as to whether the centralized conference call manager was able to contact the party at one of the numbers provided by the party (decision 430). If the party was unable to be contacted, decision 430 branches to "no" branch 435 whereupon, at step 440, a record is made in call data store 450 indicating that one or more attempts were made to contact the party but the party did not answer the centralized conference call manager's initialization call(s).

Figure 6:
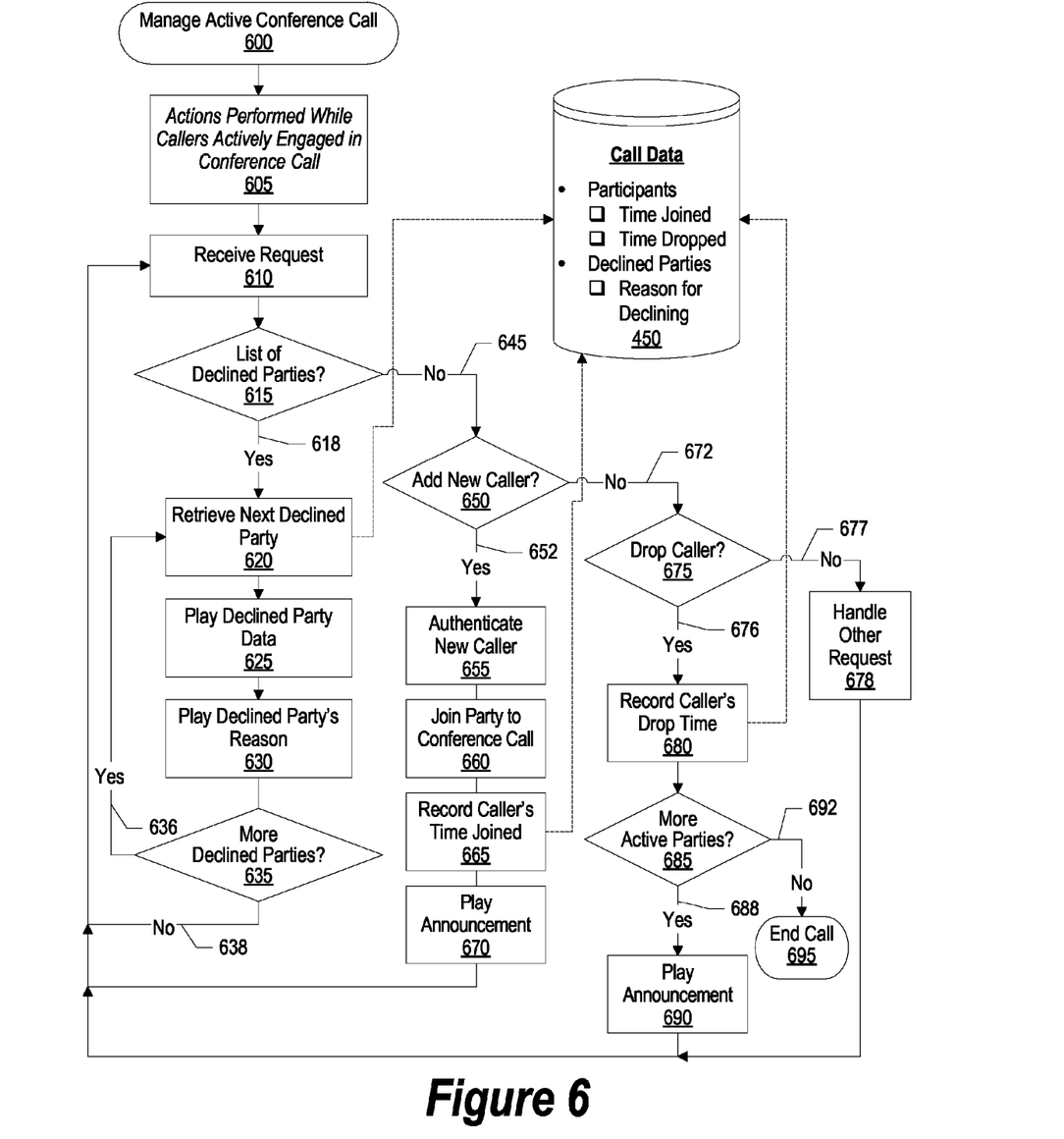
FIG. 6 is a flowchart showing steps taken by the centralized conference call manager when managing an active conference call.

On the other hand, if the party was contacted (i.e., the party answered the centralized conference call manager's initialization call), then decision 430 branches to "yes" branch 455 whereupon the centralized conference call manager manages the active conference call (predefined process 470, see FIG. 6 and corresponding text for processing details).

A determination is made as to whether there are additional contacts (parties) that need to be called by the centralized conference call manager and joined to the conference call (decision 475). If there are additional parties to join to the conference call, decision 475 branches to "yes" branch 485 whereupon, at step 490, the data corresponding to the next party registered for the conference call is read from data store 380. Processing then loops back to contact the party and, if possible, join the party to the conference call. This looping continues until there are no more parties to contact and join to the conference call, at which point decision 475 branches to "no" branch 495 and processing loops back to wait until the date and time of the next conference call.

Figure 5:
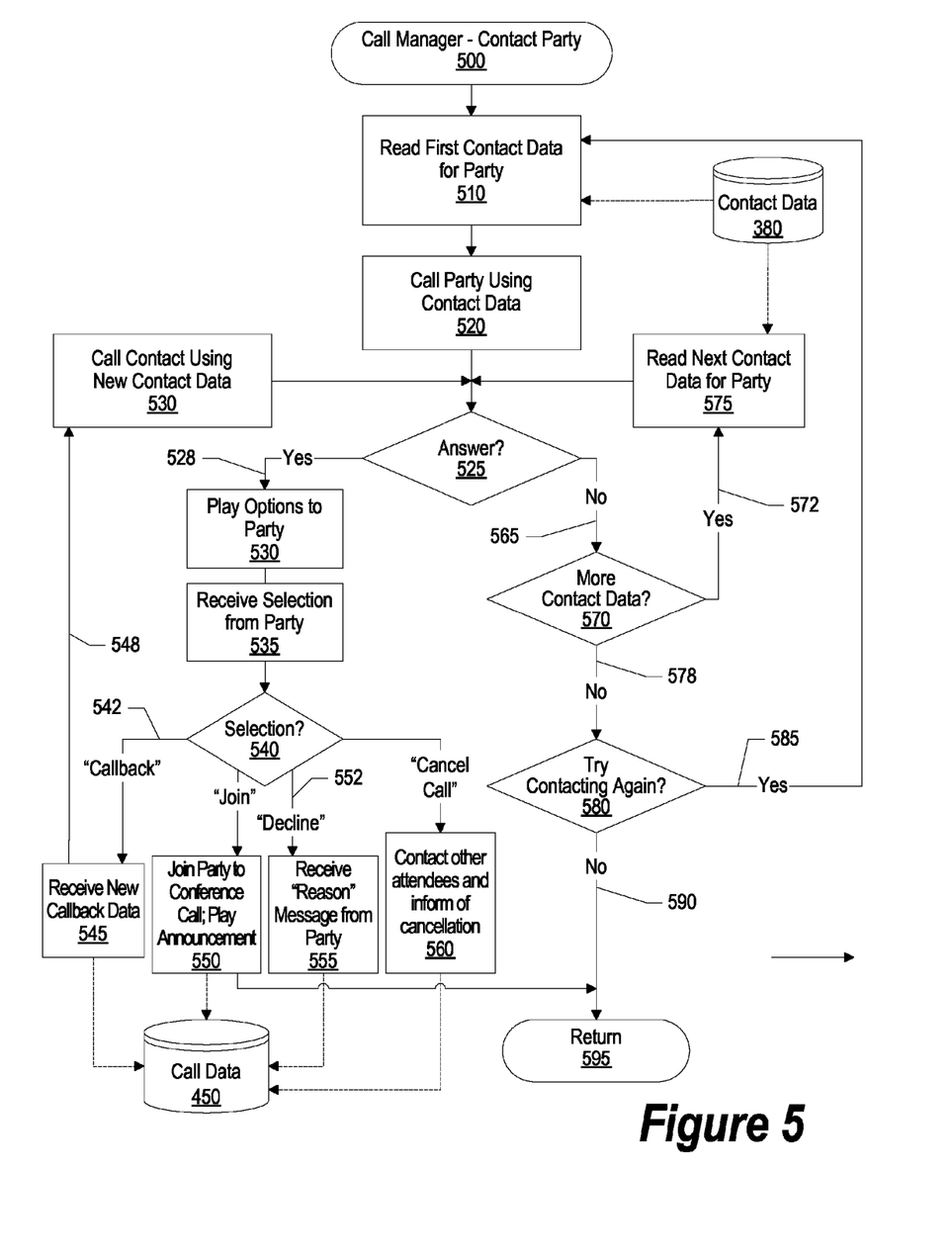
FIG. 5 is a flowchart showing steps taken by the centralized conference call manager to contact a party.

FIG. 5 is a flowchart showing steps taken by the centralized conference call manager to contact a party. Processing commences at 500 whereupon, at step 510, the first contact data (e.g., telephone number) is read from contact data store 380. At step 520, the centralized conference call manager telephones the party using the contact data read from data store 380. A determination is made as to whether the party answers the call (decision 525).

If the party answers the call, decision 525 branches to "yes" branch 528 to process the party and either join the party to the conference call, receive new callback data, or receive the party's request to decline the call with an optional verbal reason provided by the party. At step 530, the centralized conference call manager plays an audible selection to the party. For example, "You are being called to join Ms. Green's staff meeting scheduled for Tuesday June $22^{nd}$. To join the conference call, press '1'. To decline the conference call, press '2'. To request that the centralized conference call manager call you back at a different number, press '3'." The party would then make a selection, which is received at step 535.

The centralized conference call manager performs an action based upon the party's selection (decision 540). If the party requested that the centralized conference call manager call the party back at a different number, decision 540 branches to branch 542 whereupon, at step 545, the user is prompted for the callback number and the centralized conference call manager receives the callback number from the user. At step 548, the centralized conference call manager calls the user back at the new callback number. The centralized conference call manager loops back to determine if the user answered the call and, if answered, process the user's selection. In one embodiment, the user can specify a delay so that the centralized conference call manager waits for a certain period of time before calling the callback number so the user has time, if necessary, to travel to the location of the callback number. For example, perhaps the centralized conference call manager called the user at the user's home using the user's mobile telephone number, but the user noticed that his mobile telephone was running out of battery life. The user could request that the centralized conference call manager call the user back at the user's home (land-line) telephone number.

Returning to decision 540, if the user decided to join the conference call, decision 540 branches to branch 548 whereupon, at step 550, the user is joined to the conference call, an announcement is optionally provided (such as a chime or a vocal announcement e.g., "John Smith has joined the conference call," etc.). Data regarding the user's joining of the conference call (i.e., timestamp, phone number used, etc.) is written to call data store 450.

Again returning to decision 540, if the user declines the centralized conference call manager's invitation to join the conference call, decision 540 branches to branch 552 whereupon, at step 555, the user is prompted to provide a verbal reason for declining the call. Data regarding the user declining the conference call is recorded in call data store 450 (i.e., timestamp, phone number used, the user's reason for declining the invitation, etc.). In one embodiment, one or more anticipated attendees, such as the initiator of the conference call, is allowed to "cancel" the conference call and provide an explanation or reason to the other attendees. When a user "cancels" the conference call, the other anticipated attendees are contacted at step 560 and the cancellation notice is played to the anticipated attendees. If other attendees are already joined to the conference call, then the centralized conference call manager plays the cancellation notice to those attendees and ends the conference call. In addition, attendees that manually call into the conference call are also played the cancellation notice.

After the user's selection (join, or decline) has been processed, processing returns to the calling routine at 595.

If the party does not answer the centralized conference call manager's initialization call, decision 525 branches to "no" branch 565 whereupon another determination is made as to whether there is additional contact data (e.g., additional phone numbers) to use to try an contact the party (decision 570). If there is additional contact data, decision 570 branches to "yes" branch 573 whereupon, at step 575, the next contact data corresponding to the party is read from contact data store 380 and processing loops back to attempt reaching the party using the newly read contact data. This looping continues until either the party answers one of the calls (decision 525 branching to "yes" branch 528), or there is no more contact data corresponding to the party for the centralized conference call manager to use, at which point decision 570 branches to "no" branch 578.

If the centralized conference call manager runs out of contact data to use to try to contact the party (decision 570 branching to "no" branch 578), then another determination is made as to whether to use the user's contact data and try to contact the user again (decision 580). For example, the user may have requested that the centralized conference call manager try each of user's contact numbers three times before recording that the user was not available to take the call. If the centralized conference call manager is going to try again, then decision 580 branches to "yes" branch 585 whereupon processing loops back to try contacting the user starting with the user's first-listed contact data. This looping continues until either the user is contacted (decision 525 branching to "yes" branch 528), or a decision is made to not try and contact the user again, whereupon decision 580 branches to "no" branch 590 and processing returns at 595.

FIG. 6 is a flowchart showing steps taken by the centralized conference call manager when managing an active conference call. Processing commences at 600 whereupon, at step 605, actions are performed while one or more users are actively engaged in a conference call. From time to time, users can request information from the centralized conference call manager. At step 610 a request is received from one of the users.

A determination is made as to whether the request was for a list of parties that declined to join the conference call (decision 615). If the request was for a list of parties that declined to join the conference call, decision 615 branches to "yes" branch 618 whereupon, at step 620 information regarding the next (first) party that declined to join the conference call is retrieved from call data store 450. At step 625, the centralized conference call manager audibly plays data regarding the declined party (i.e., the timestamp of when the user was contacted, a phone number (if not private) that was used to contact the party, etc.). In addition, at step 630, if the party left a message as to why he or she was unable to attend the conference call, then the message is played by the centralized conference call manager. A determination is made as to whether there is data regarding additional parties that declined to join the conference call (decision 635). If there are additional parties that declined to join the conference call, decision 635 branches to "yes" branch 636 whereupon processing loops back to read and playback the data regarding the next party that declined. This looping continues until data for all declined parties has been retrieved and played back, at which time decision 635 branches to "no" branch 638 and loops back to step 610 to receive the next request from one of the users.

Returning to decision 615, if the request is not for a list of parties that declined to join the conference call, then decision 615 branches to "no" branch 645 whereupon another determination is made as to whether the request is to add a new caller (decision 650). For example, someone calling into the conference call that did not register with the centralized conference call manager. If the request is to add a new caller, then decision 650 branches to "yes" branch 652 to process the new caller.

At step 655 the new caller is authenticated (i.e., using an identifier, PIN code, etc.). If the new caller is authenticated, the centralized conference call manager, at step 660, joins the new party to the conference call. At step 665, the centralized conference call manager records information about the new caller, such as the timestamp and phone number used, in call data store 450. At step 670, an announcement is optionally provided (such as a chime or a vocal announcement e.g., "John Smith has joined the conference call," etc.). Processing thereafter loops back to receive the next request from a user.

Returning to decision 650, if the request was not for a list of declined parties nor for adding a new caller, decision 650 branches to "no" branch 672 whereupon a determination is made as to whether the request is to drop one of the parties from the conference call (i.e., the user hung up, the phone was disconnected, etc.). If the request was not to drop a caller, decision 675 branches to "no" branch 677 whereupon, at step 677 a different ("other") request is handled by the centralized conference call manager. On the other hand, if the request was to drop a user from the conference call, decision 675 branches to "yes" branch 676 whereupon, at step 680, the timestamp corresponding to the time that the user dropped from the conference call is recorded in call data store 450. A determination is made as to whether there are any more active conference call participants (decision 685). If there are still active conference call participants, decision 685 branches to "yes" branch 688 whereupon processing loops back to handle the next request from a user. On the other hand, if there are no more conference call participants, decision 685 branches to "no" branch 692 whereupon the conference call is ended at 695.

Figure 7:
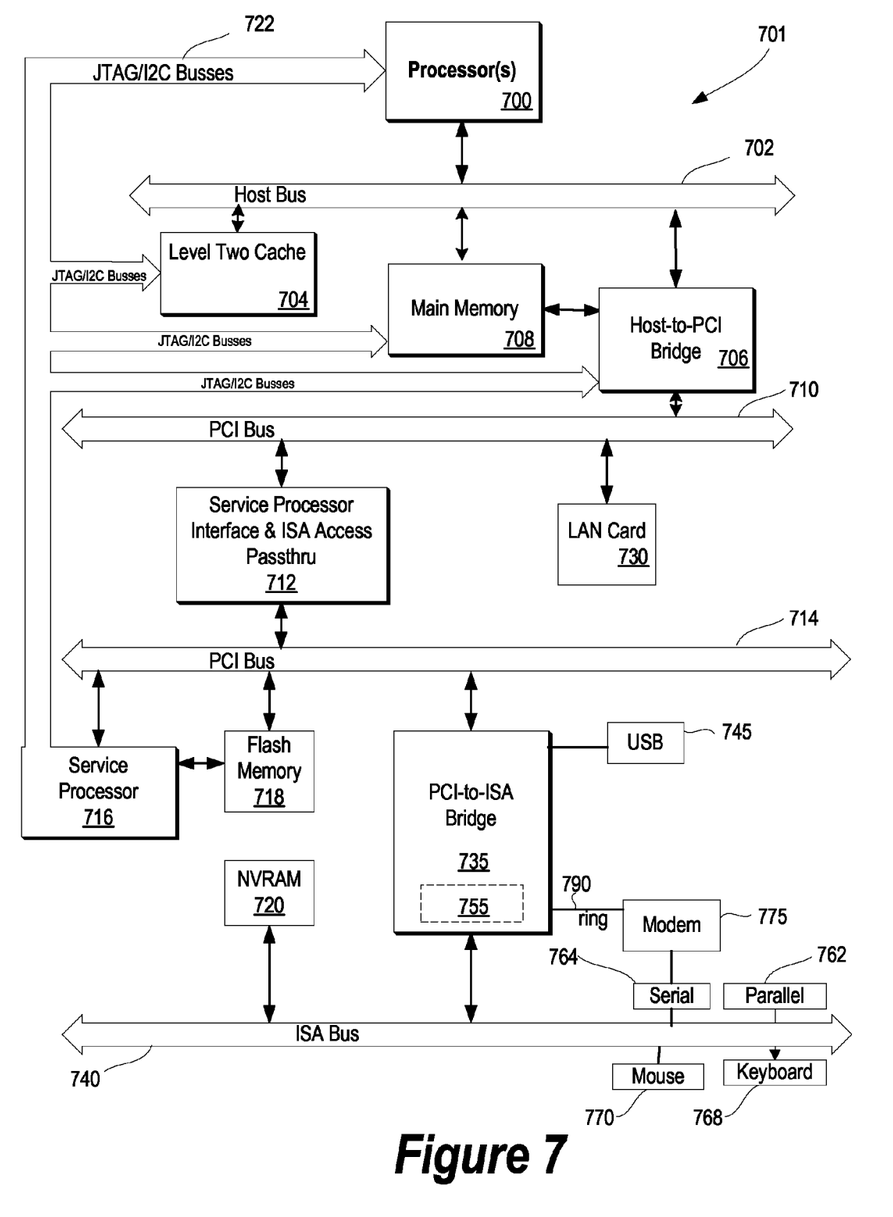
FIG. 7 is a block diagram of an information handling system capable of implementing the present invention.

FIG. 7 illustrates information handling system 701 which is a simplified example of a computer system capable of performing the operations described herein. Computer system 701 includes processor 700 which is coupled to host bus 705. A level two (L2) cache memory 710 is also coupled to the host bus 705. Host-to-PCI bridge 715 is coupled to main memory 720, includes cache memory and main memory control functions, and provides bus control to handle transfers among PCI bus 725, processor 700, L2 cache 710, main memory 720, and host bus 705. PCI bus 725 provides an interface for a variety of devices including, for example, LAN card 730. PCI-to-ISA bridge 735 provides bus control to handle transfers between PCI bus 725 and ISA bus 740, universal serial bus (USB) functionality 745, IDE device functionality 750, power management functionality 755, and can include other functional elements not shown, such as a real-time clock (RTC), DMA control, interrupt support, and system management bus support. Peripheral devices and input2Ooutput (I2OO) devices can be attached to various interfaces 760 (e.g., parallel interface 762, serial interface 764, infrared (IR) interface 766, keyboard interface 768, mouse interface 770, fixed disk (HDD) 772 coupled to ISA bus 740. Alternatively, many I2OO devices can be accommodated by a super I2OO controller (not shown) attached to ISA bus 740.

BIOS 780 is coupled to ISA bus 740, and incorporates the necessary processor executable code for a variety of low-level system functions and system boot functions. BIOS 780 can be stored in any computer readable medium, including magnetic storage media, optical storage media, flash memory, random access memory, read only memory, and communications media conveying signals encoding the instructions (e.g., signals from a network). In order to attach computer system 701 to another computer system to copy files over a network, LAN card 730 is coupled to PCI bus 725 and to PCI-to-ISA bridge 735. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    registering a conference call with a centralized conference call manager computer system, the registering including receiving registration data, wherein the registration data includes a time and a date of the anticipated conference call and one or more telephone numbers for each of a plurality of anticipated conference call attendees, and wherein the registration data further includes priority information regarding an order in which the anticipated conference call attendees should be added to the conference call;
    storing the registration data at the centralized conference call manager computer system;
    initiating, from the centralized conference call manager computer system, the conference call between a plurality of the anticipated attendees, wherein the initiating includes calling the anticipated attendees using the stored telephone numbers at the stored date and time, and wherein the initiating occurs in a predetermined order based upon the priority information included in the registration data, and wherein one of the anticipated attendees is called before other anticipated attendees based upon the predetermined order;
    receiving an answer from one or more of the anticipated attendees;
    joining one or more of the anticipated attendees from which an answer is received in the conference call;
    in response to the joining, receiving a cancel request from one of the anticipated attendees;
    in response to receiving the cancel request, contacting one or more of the other anticipated attendees; and
    playing a message to each of the contacted other anticipated attendees indicating that the conference call has been canceled.

2. The method of claim 1 further comprising:
    providing the anticipated attendees from which an answer is received with a plurality of service options; and
    receiving a selection from each of the anticipated attendees, wherein the joining is performed in response to one of the selections.

3. The method of claim 2, wherein one of the selections is a callback selection, the method further comprising:
    receiving, from at least one of the anticipated attendees from which an answer is received, the callback selection and a callback telephone number; and
    calling the anticipated attendee corresponding to the callback selection using the received callback telephone number.

4. The method of claim 2, wherein one of the selections is a decline conference call selection, the method further comprising:
    receiving, from one of the anticipated attendees from which an answer is received, the decline conference call selection and a verbal response; and
    storing the verbal response on a nonvolatile storage device accessible from the centralized conference call manager computer system.

5. The method of claim 4 further comprising:
    playing the verbal response to one or more of the anticipated attendees that joined the conference call, wherein the playing is performed in response to one of the anticipated attendees that joined the conference call requesting a list of declined parties from the centralized conference call manager computer system.

6. The method of claim 1 further comprising:
    receiving a drop request from one or more of the attendees that joined the conference call;
    dropping the attendees from whom the drop request was received from the conference call;
    storing a joined timestamp for the attendees corresponding to the time that each attendee joined the conference call on the nonvolatile storage device; and
    storing a dropped timestamp corresponding to the time at which each of the dropped attendees was dropped from the conference call.

7. The method of claim 1 wherein a plurality of anticipated attendees are called in parallel by the centralized conference call manager computer system.

8. An information handling system comprising:
    one or more processors;
    a memory area accessible by the processors for storing telephone call data;
    a transmitter for transmitting voice input received over a telephone network;
    a receiver for receiving voice data from the telephone network;
    a nonvolatile storage device accessible from the processors; and
    a conference call tool joining anticipated attendees to a conference call, the conference call tool including software effective to:
        register a conference call with the information handling system, the registration including software effective to receive registration data, wherein the registration data includes a time and a date of the anticipated conference call and one or more telephone numbers for each of a plurality of the anticipated conference call attendees, and wherein the registration data further includes priority information regarding an order in which the anticipated conference call attendees should be added to the conference call;
        store the registration data on the nonvolatile storage device;
        initiate the conference call between a plurality of the anticipated attendees by calling the anticipated attendees using the stored telephone numbers at the stored date and time, wherein the initiating occurs in a predetermined order based upon the priority information included in the registration data, and wherein one of the anticipated attendees is called before other anticipated attendees based upon the predetermined order;
        receive an answer from one or more of the anticipated attendees;
        join one or more of the anticipated attendees from which an answer is received in the conference call;
        in response to the joining, receive a cancel request from one of the anticipated attendees;
        in response to receiving the cancel request, contact one or more of the other anticipated attendees; and
        play a message to each of the contacted other anticipated attendees indicating that the conference call has been canceled.

9. The information handling system of claim 8 wherein the conference call tool further comprises software effective to:
   provide the anticipated attendees from which an answer is received with a plurality of service options; and
   receive a selection from each of the anticipated attendees, wherein the software effective to join the attendees is executed in response to one of the selections.

10. The information handling system of claim 9, wherein one of the selections is a callback selection, wherein the conference call tool further comprises software effective to:
   receive, from at least one of the anticipated attendees from which an answer is received, the callback selection and a callback telephone number; and
   telephone the anticipated attendee corresponding to the callback selection using the received callback telephone number.

11. The information handling system of claim 9, wherein one of the selections is a decline conference call selection, wherein the conference call tool further comprises software effective to:
   receive, from one of the anticipated attendees from which an answer is received, the decline conference call selection and a verbal response;
   store the verbal response on the nonvolatile storage device; and
   play the verbal response to one or more of the anticipated attendees that joined the conference call.

12. The information handling system of claim 9 wherein the conference call tool further comprises software effective to:
   receive, from one of the attendees that joined the conference call, a declined parties list request, wherein the software used to play the verbal response is executed in response to receiving the declined parties list request.

13. The information handling system of claim 8 wherein the conference call tool further comprises software effective to:
   receive a drop request from one or more of the attendees that joined the conference call;
   drop the attendees from whom the drop request was received from the conference call;
   store a joined timestamp for the attendees corresponding to the time that each attendee joined the conference call on the nonvolatile storage device; and
   store a dropped timestamp corresponding to the time at which each of the dropped attendees was dropped from the conference call.

14. A computer program product stored on a non-transitory computer readable media, the non-transitory computer readable media storing instructions for execution by an information handling system, which when executed by the information handling system, cause the information handling system to perform a method comprising:
   registering a conference call with a centralized conference call manager, wherein the registration data includes a time and a date of the anticipated conference call and one or more telephone numbers for each of a plurality of the anticipated conference call attendees, and wherein the registration data further includes priority information regarding an order in which the anticipated conference call attendees should be added to the conference call;
   storing the registration data on a nonvolatile storage device;
   initiating the conference call between a plurality of the anticipated attendees by calling the anticipated attendees using the stored telephone numbers at the stored date and time, wherein the initiating occurs in a predetermined order based upon the priority information included in the registration data, and wherein one of the anticipated attendees is called before other anticipated attendees based upon the predetermined order;
   receiving an answer from one or more of the anticipated attendees;
   joining one or more of the anticipated attendees from which an answer is received in the conference call;
   in response to the joining, receiving a cancel request from one of the anticipated attendees;
   in response to receiving the cancel request, contacting one or more of the other anticipated attendees; and
   playing a message to each of the contacted other anticipated attendees indicating that the conference call has been canceled.

15. The computer program product of claim 14 wherein the method further comprises:
   providing the anticipated attendees from which an answer is received with a plurality of service options; and
   receiving a selection from each of the anticipated attendees, wherein the software effective to join the attendees is executed in response to one of the selections.

16. The computer program product of claim 15, wherein one of the selections is a callback selection, and wherein the method further comprises:
   receiving, from at least one of the anticipated attendees from which an answer is received, the callback selection and a callback telephone number; and
   telephoning the anticipated attendee corresponding to the callback selection using the received callback telephone number.

17. The computer program product of claim 15, wherein one of the selections is a decline conference call selection, and wherein the method further comprises:
   receiving, from one of the anticipated attendees from which an answer is received, the decline conference call selection and a verbal response; and
   storing the verbal response on the nonvolatile storage device.

18. The computer program product of claim 17 wherein the method further comprises:
   playing the verbal response to one or more of the anticipated attendees that joined the conference call in response to receiving a request from one of the attendees that joined the conference call for a list of declined parties.

19. The computer program product of claim 14 wherein the method further comprises:
   receiving a drop request from one or more of the attendees that joined the conference call;
   dropping the attendees from whom the drop request was received from the conference call;
   storing a joined timestamp for the attendees corresponding to the time that each attendee joined the conference call on the nonvolatile storage device; and
   storing a dropped timestamp corresponding to the time at which each of the dropped attendees was dropped from the conference call.

20. The computer program product of claim 14 wherein a plurality of anticipated attendees are called in parallel by the centralized conference call manager.

* * * * *